Patented Sept. 25, 1951

2,569,409

UNITED STATES PATENT OFFICE 2,569,409

AMIDE-LINKED BIS-QUATERNARY AMMONIUM COMPOUNDS

Peter L. de Benneville and Charles L. Levesque, Philadelphia, Pa., assignors to Rohm & Haas Company, Philadelphia, Pa., a corporation of Delaware No Drawing. Application September 27, 1950,
Serial No. 187,149

6 Claims. (Cl. 260—558)

This invention deals with compounds of the formula

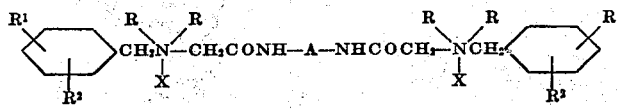

wherein R is methyl or ethyl, $R^1$ is an alkyl group of seven to nine carbon atoms, $R^2$ is hydrogen or methyl, A is an ethylene or propylene group, $C_nH_{2n}$, and X is an anion. These compounds are valuable bactericides and fungicides. They are characterized by good solubility and effectiveness against many different types of organisms at considerable dilution and under adverse conditions. For instance, they are bactericidally active in hard water and in the presence of organic material.

Many quaternary ammonium compounds suffer a considerable decrease in activity in hard water and/or in water contaminated with organic materials which are normally encountered in the use of these compounds as disinfectants. These undesirable effects do not appear or are minimized with the compounds of this invention.

The bis-quaternary ammonium compounds of this invention have amide linkages in the chain between the quaternary nitrogens. They rely for their hydrophobic portion upon N-alkylbenzyl groups which have seven to nine carbon atoms in the alkyl radical. While bis-quaternary ammonium compounds with smaller or larger alkylbenzyl groups can be prepared, such compounds do not exhibit the high phenol coefficients which are found for the claimed compounds.

Compounds of the formula given above are prepared through a series of reactions which involve an alkylenediamine, a haloacetyl halide, a secondary amine, and an alkylbenzyl halide. The reactions may be carried out, for example, with an alkylenediamine, a haloacetyl halide, and a tertiary amine having an N-alkylbenzyl substituent which can be prepared from an alkylbenzyl halide and a secondary amine. Ethylenediamine and propylenediamine are the diamines of choice. Chloroacetyl chloride is the preferred haloacetyl halide. Dimethylamines or diethylamines are the preferred secondary amines and dimethylalkylbenzylamines and diethylalkylbenzylamines are the preferred tertiary amines. Either an alkylbenzyl chloride or an alkylbenzyl bromide may be used.

The alkylbenzyl groups in the above compounds may be heptylbenzyl, octylbenzyl, or nonylbenzyl in their various isomeric forms, the relative position of the alkyl group on the benzene ring, the form of this alkyl group, and the presence of one or more methyl substituents being but minor variants. The alkylbenzyl halides and tertiary amines, which may be derived from them, are based on alkylbenzenes such as (1-methylhexyl)-benzene, (1-ethylpentyl)benzene, (1,3-dimethyl-1-propylbutyl)benzene, (1-methylheptyl)benzene, (2-ethylhexyl)benzene, (1-ethylhexyl)benzene, (3,5,5-trimethylhexyl)benzene, o-, m-, or p-octyltoluene, p-(1-methylheptyl)toluene, heptylxylenes, p-(1-ethylpentyl)toluene, (1-ethyl-3-methylbutyl)benzene, and the like and mixtures of such compounds. The alkyl group may be of straight or branched chain structure and may be primary, secondary, or tertiary.

Known methods for introducing alkyl groups in the benzene ring may be used for preparation of the starting hydrocarbons. For example, an acyl halide may be reached with benzene or toluene or a xylene and the acyl group thus introduced reduced. Alkyl groups are also obtained from olefines or alcohols by known methods.

The alkylbenzenes are converted to alkylbenzyl halides by halomethylation. The alkylbenzene is reacted, for example, with formaldehyde and hydrogen chloride or hydrogen bromide in the presence of a catalyst mixture of zinc chloride and a lower aliphatic monocarboxylic acid, such as formic, acetic, chloroacetic, or propionic. Acid anhydrides may be used in place of these acids or in admixture therewith. Formaldehyde may be used as a gas or as a revertible polymer. The equivalent of formaldehyde and hydrogen chloride or bromide is provided by a halomethyl ether.

The most effective ratio of zinc chloride to carboxylic acid or anhydride is one mole of the former to 1.5 to 8 moles of the latter. For one mole equivalent of an alkylbenzene from one to 2.5 and preferably 1.5 to 2.5 moles of formaldehyde are used together with 0.5 to 2.5 moles of zinc chloride associated with the proportion of carboxylic acid stated. Reaction temperatures of 50 to 100° C. are effective. By this method good yields of alkylbenzyl halides are obtained with introduction almost entirely of a single halomethyl group and without formation of troublesome resinous products.

Examples of the preparation of some typical alkylbenzyl halides follow. Parts shown are by weight.

Example 1

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and separate into layers. The upper layer was washed with water, with sodium bicarbonate solution, and with water and then distilled. At 127°–132° C./2 mm. there was obtained a fraction of 128 parts which corresponded in composition to heptylbenzyl chloride.

Example 2

A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./mm. 71 parts of octylbenzyl chloride.

Example 3

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

Example 4

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

Example 5

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

In the reaction vessel equipped with a stirrer a mixture was made of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

Example 6

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewski, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

Example 7

Commercial diisobutyl carbinol was dipped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

Example 8

Boron trifluoride gas was slowly bubbled into 18 parts of water during a 45-minute period while the temperature of the water solution was kept below 30° C. The increase in weight of the solution showed that 68 parts of boron trifluoride had been absorbed.

There were mixed 86 parts of the above boron trifluoride solution and 117 parts of benzene and thereto was added dropwise with good agitation 126 parts of propylene trimer with the temperature at 25°–30° C. Two hours were allowed for the reaction. The reaction mixture was then permitted to form layers, which were separated. The oil layer was washed and distilled at reduced pressure. The product, nonylbenzene, was collected at 127°–152° C./27 mm.

A mixture was prepared from 612 parts of nonylbenzene prepared as above, 205 parts of anhydrous zinc chloride, and 240 parts of glacial acetic acid and thereto was slowly added 345 parts of dichloromethyl ether with the temperature at 55° C. The reaction mixture was then stirred for two hours with the temperature at 70° C. Layers were then separated. The oil layer was washed with hot water and with 10% sodium bicarbonate solution and then stripped to yield crude nonylbenzyl chloride. This was distilled at 128°–152° C./1.5 mm. to give a product which corresponded very closely in composition to theory.

Other alkylbenzyl or alkylmethylbenzyl halides can be prepared by similar methods. These halides are used in several ways. They may be converted to tertiary amines by reaction with a secondary amine and the resulting tertiary amine reacted with an alkylene bis(haloacetamide) to give a bis-quaternary ammonium salt. Alternatively, the alkylbenzyl halide may be reacted with a bis tertiary amine formed by reaction of an alkylene bis(haloacetamide) and a secondary amine.

When the alkylbenzyl halides or alkylmethylbenzyl halides are converted to tertiary amines to be reacted with an alkylene bis(haloacetamide), the conversion to tertiary amine is accomplished by reacting an alkylbenzyl halide with a secondary amine such as dimethylamine or diethylamine in the presence of an alkaline agent for taking up hydrogen halide. An alkali metal hydroxide or an organic base, such as pyridine, or excess of the reacting amine may be used. Although this type of reaction is conventional, specific examples will be given to illustrate a convenient procedure. The method is similar to that described for reacting benzyl chloride and dimethylamine (Ber. 42, 2593 (1909) or Bull. soc. chim. (IV) 15, 168 (1915)) except that an alkylbenzyl halide is used and the system need not be anhydrous. The reaction is conveniently carried out in the presence of an inert organic solvent such as benzene, toluene, carbon tetrachloride, or the like. The alkylbenzyldimethylamines or alkylbenzyldiethylamines may usually be purified by distillation.

Procedures illustrating the step of forming alkylbenzyl dialkylamines follow.

Example 9

To a solution of eight parts of sodium hydroxide in 30 parts of water there was added 22.5 parts of an aqueous 40% dimethylamine solution. The reaction vessel in which this mixture was prepared carried a refluxing system cooled with Dry Ice and acetone. To the mixture there was added 22.5 parts of heptylbenzyl chloride. The reaction mixture was heated to give gentle refluxing and dimethylamine was slowyl passed in during the course of three hours. Layers were then allowed to form and were separated. The product layer was washed with water until neutral to litmus and was heated under reduced pressure. There was obtained 20 parts of a light oil which gave the correct analysis for heptylbenzyldimethylamine.

This procedure was followed with 25.3 parts of nonylbenzyl chloride in place of the 22.5 parts of heptylbenzyl chloride shown above. There was obtained nonylbenzyldimethylamine in a yield of 18 parts. The same procedure applied to an equivalent amount of octylbenzyl chloride yielded octylbenzyldimethylamine. Substitution of equivalent weights of diethylamine led to the corresponding alkylbenzyldiethylamines.

In the series of reactions leading to bis-quaternary ammonium compounds of this invention there are used ethylene or propylene bis(haloacetamides). These are prepared by reacting ethylenediamine or propylenediamine with a haloacetyl halide, $XCH_2COX$ where X is chlorine or bromine. This is conveniently accomplished in the presence of an organic solvent and with the aid of a basic material for taking up hydrogen halide.

A convenient procedure for carrying out the above reaction is illustrated in the following example.

Example 10

There were mixed 75 parts of glacial acetic acid, 147 parts of anhydrous potassium acetate, and 75 parts of water. Thereto was slowly added with stirring 30 parts of ethylenediamine and then with stirring and cooling 165 parts of chloroacetyl chloride. The reaction mixture was stirred for three hours. Then, 520 parts of a 25% aqueous sodium hydroxide solution was slowly added with cooling to render the mixture slightly alkaline. The product separated as crystals which were filtered off and recrystallized from 90% methanol. The product melted at 171°–173° C. and corresponded in composition to ethylene bis(chloroacetamide). Cf. Jacobs and Heidelberger, J. Biol. Chem. 21, 151 (1915).

In the same way there are reacted 37 parts of propylenediamine and 165 parts of chloroacetyl chloride to give propylene bis(chloroacetamide).

Reaction of an alkylene bis(haloacetamide) and and alkylbenzyldialkylamine yields a bis-quaternary compound. Approximately one mole of the former is reacted with two moles of the latter. The two reactants may be mixed directly or in the presence of an organic solvent such as benzene, toluene, xylene, isopropanol, butyl alcohol, isopropyl ether, a nitroparaffin such as nitromethane, acetonitrile, formamide, or the like. The mixture is heated between 30° C. and about 150° C., solvent may be driven off, and the quaternary ammonium salt recovered as a residue. In some cases it is convenient to precipitate this salt or to crystallize it.

Typical preparations by this method are described in the following examples.

of product. This product corresponds in composition to

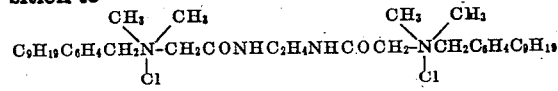

It has a phenol coefficient of 350 against *Salmonella typhosa* and 500 against *Staphylococcus aureus*.

Example 14

A mixture of 11 parts of ethylene bis(chloroacetamide), 28.6 parts of nonylmethylbenzyldimethylamine, and 60 parts of acetonitrile was heated under reflux for five hours and allowed to stand for 16 hours. The solvent was then removed when the mixture was heated under reduced pressure. There remained 38.1 parts of a hard, colorless solid. This material corresponds fairly closely in composition to

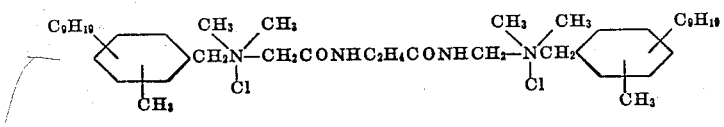

Example 11

There were mixed 21.3 parts of propylene bis(chloroacetamide), 52.5 parts of heptylbenzyldiethylamine, and 100 parts of toluene and the mixture was heated under reflux for four hours. When the reaction mixture was cooled, a slurry resulted. This was extended with heptane and filtered. A light-colored solid was thus obtained. This corresponds in composition to

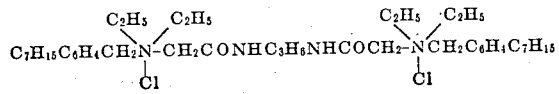

This compound has phenol coefficients of about 350 and 450 against *Salmonella typhosa* and *Staphylococcus aureus*.

Example 12

A mixture of 51.9 parts of octylbenzyldimethylamine, 21.7 parts of ethylene bis(chloroacetamide), and 60 parts of acetonitrile was heated under reflux for five hours. The mixture was cooled. Within about 20 minutes the product precipitated as fine crystals, which were filtered off and dried. The product contained 9.83% of ionizable chlorine and corresponded in composition to

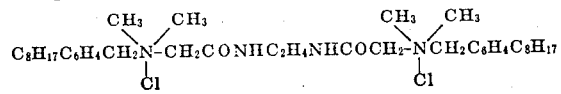

of 98% purity. The yield was 50 parts. This product was found to be very soluble in water. A 25% solution in water was entirely stable when stored at 5° C. This compound has phenol coefficients of 1000 against both *Salmonella typhosa* and *Staphylococcus aureus*. It was found to retain its unusually high phenol coefficient in hard waters and in water contaminated with small amounts of food products.

Example 13

A mixture of 15.6 parts of ethylene bis(chloroacetamide), 39.5 parts of nonylbenzyldimethylamine, and 40 parts of acetonitrile was heated under reflux for four and a half hours and left standing overnight. Crystals had then formed. They were filtered off and dried to yield 40.2 parts It gives stable aqueous solutions at concentrations of 25% or more. It has phenol coefficients of 315 and 265 against *Salmonella typhosa* and *Staphylococcus aureus* respectively. It shows excellent activity in the broth titer test against a variety of organisms, including *S. pyogenes, N. catarrhalis, B. suis, C. welchii*, and others.

An alkylene bis(haloacetamide) may be converted to a tertiary amine by reacting it with a secondary amine. For this purpose dimethylamine or diethylamine are the secondary amines of first choice, although other secondary amines can be used in this step. The reaction is best carried out in an inert organic solvent and in the presence of an alkaline agent for taking up hydrogen halide. An inorganic base such as caustic soda, an organic base such as pyridine, or excess of the secondary amine will serve this purpose. The reaction here is entirely comparable to that described above for converting an alkylbenzyl halide to a tertiary amine (cf. Von Braun and Münch, Berichte 60, 349–351 (1927)).

Example 15

A mixture of 10.7 parts of ethylene bis-chloroacetamide and 13.5 parts of dimethylamine gas dissolved in 40 parts of cold anhydrous ethyl alcohol or benzene was heated under pressure for 24 hours at 100° C. The bomb was chilled and carefully opened, the dimethylamine hydrochloride removed by filtration, and the solvent stripped by warming under reduced pressure. The product resulting was ethylene bis(dimethylaminoacetamide).

Example 16

By the procedure just described there were mixed 96 parts of an aqueous 20% caustic soda solution and 37 parts of diethylamine. Thereto was slowly added 114 parts of propylene bis-(chloroacetamide). The mixture was warmed for six hours with reflux from a chilled condenser. The reaction mixture was allowed to form layers, which were separated. The organic layer was washed and dried over calcium sulfate. The product was propylene bis(diethylaminoacetamide).

The alkylene bis(aminoacetamides) are reacted with an alkylbenzyl halide in much the same way as shown above for reacting an alkylene bis(haloacetamide) and an alkylbenzyldialkylamine. The reactants may be combined directly or, usually more conveniently, they are reacted together in an inert organic solvent such as benzene, toluene, isopropyl ether, isopropyl alcohol, butyl acetate, ethylene dichloride, formamide, or nitromethane. The reaction mixture is heated under reflux and then solvent taken off or the product precipitated or crystallized.

Typical preparations of this kind follow.

*Example 17*

There were mixed 23 parts of ethylene bis-(dimethylaminoacetamide), 48 parts of octylbenzyl chloride, and 55 parts of acetonitrile. The mixture was heated under reflux for four hours and then stripped under low pressure. The product was a very soluble bis-quaternary ammonium chloride. It had phenol coefficients of 980 and 1020 against *Salmonella typhosa* and *Staphylococcus aureus* respectively.

*Example 18*

There were mixed 30 parts of propylene bis-(diethylaminoacetamide), 48 parts of octylbenzyl chloride, and 70 parts of acetonitrile. This mixture was heated under reflux for six hours, allowed to stand overnight, and cooled. The product was precipitated. It was filtered off and dried. This product corresponds in composition to

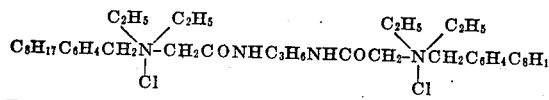

It is fairly soluble in water, stable in solution, stable in mixtures with builders such as sodium phosphate, pyrophosphate, and the like, stable in aqueous solutions of such mixtures and peculiarly effective as a disinfectant. It has a phenol coefficient of 850 against *Salmonella typhosa*.

*Example 19*

The above preparation was repeated with substitution of 57 parts of octylbenzyl bromide for the above chloride. The product was soluble and stable with a phenol coefficient of 900 against *Salmonella typhosa*.

*Example 20*

The above preparation was repeated with 51 parts of octylmethylbenzyl chloride. The product was a soluble, stable, effective compound having phenol coefficients of 950 and 980 against *Salmonella typhosa* and *Staphylococcus aureus* respectively.

Typical compounds of this invention were evaluated by determination of the greatest effective dilutions at which the compounds were effective bactericidally and bacteriostatically against a wide variety of bacteria, both Gram-positive and Gram-negative. The evaluation was based on a method of successive dilution in which a trypticase-soy broth was utilized. One percent solutions of the products to be tested were diluted with the broth. The resulting dilutions were autoclaved for ten minutes at 10 to 12 pounds pressure. The dilutions were then cooled and inoculated with a four millimeter loopful of a culture of a test organism. The inoculated dilutions were incubated at 37° C. for 24 hours. The highest dilution showing no growth gave the value for bacteriostatic action. The dilutions were then incubated for a second 24 hour period at 37° C. Subcultures were then made by transferring three loopfuls from cultures showing no growth to fresh broth. The resulting subcultures were incubated for 48 hours at 37° C. The highest dilution showing no growth was the endpoint for bactericidal action.

Typical of data obtained are those given in the table, wherein results are presented for ethylene bis(octylbenzyldimethylammonium chloride acetamide).

TABLE

*Effective dilutions for the N-octylbenzyl compound*

| Organism | Gram-type | Effective Dilution | |
|---|---|---|---|
| | | Bacteriostatic | Bactericidal |
| S. aureus | + | 1:512,000 | 1:256,000 |
| S. pyrogenes | + | 1:1,000,000 | 1:1,000,000 |
| S. fecalis | + | 1:512,000 | 1:16,000 |
| N. catarrhalis | − | 1:512,000 | 1:64,000 |
| S. typhosa | − | 1:256,000 | 1:4,000 |
| P. aeruginosa | − | 1:32,000 | 1:1,000 |
| P. vulgaris | − | 4:4,000 | 1:1,000 |
| B. suis | − | 1:512,000 | 1:8,000 |
| C. welchii | − | 1:64,000 | 1:64,000 |

Results with other compounds of this invention are similar. The results demonstrate that these compounds are effective at relatively low dilutions against organisms which are often difficult to control.

An even more striking evaluation of compounds of this invention is based on activity in hard water and in the presence of organic contaminants. For example, in water having a hardness equivalent to 400 parts per million as calcium carbonate the compounds of this invention give kills of 99.9% within 30 seconds at concentration of compound of 50 parts per million. Typical commercial quaternaries were tested under the same conditions. Compound A required over 60 seconds at 50 P. P. M. Compound B required over 300 seconds at 50 P. P. M. Compound C failed to give a 99% kill in 300 seconds even at 200 P. P. M.

Evaluations were made in water having a hardness of 30 grains per gallon to which one percent of an ice cream mix was added. A 99.9% kill was obtained in less than 30 seconds with 200 P. P. M. of the N-octylbenzyl quaternaries of this invention. The nonylbenzyl quaternaries gave a 99.9% kill at 200 P. P. M. in less than one minute, while this kill was obtained with ethylene bis(nonylmethylbenzyl dimethyl ammonium chloride acetamide) in less than two minutes. Available commercial quaternaries required over five minutes at 200 P. P. M.

The test method used in the above evaluations was based on the Oval Tube Method of F. W. Barber, in which a synthetic hard water is used and the organic contaminant is an ice cream mix.

We claim:

1. Compounds of the structure

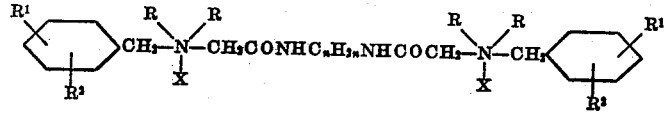

wherein R is an alkyl group of not over two carbon atoms, R¹ is an alkyl group of seven to nine carbon atoms, R² is a member of the class consisting of hydrogen and the methyl group, X is an anion, and $n$ is an integer from two to three.

2. A compound of the structure

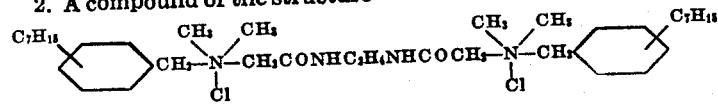

3. A compound of the structure

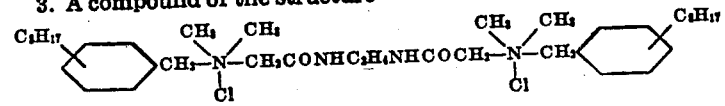

4. A compound of the structure

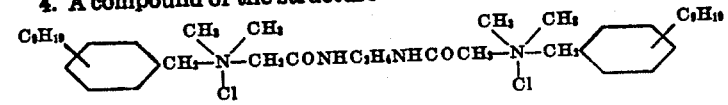

5. A compound of the structure

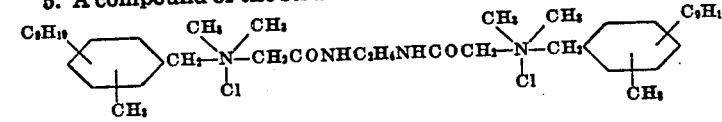

6. A compound of the structure

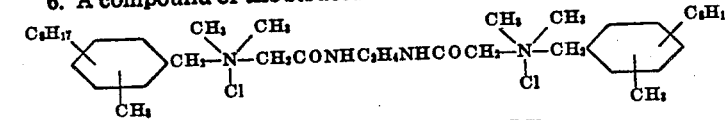

PETER L. DE BENNEVILLE.
CHARLES L. LEVESQUE.

No references cited.